United States Patent [19]

Haldric et al.

[11] Patent Number: 4,657,281

[45] Date of Patent: Apr. 14, 1987

[54] DEVICE FOR ADJUSTING A STEERING COLUMN OF A MOTOR VEHICLE PROVIDED WITH TOGGLE LOCKING MEANS

[75] Inventors: Bernard Haldric; Grégorio Bénédi; Daniel Pretot, all of Vendome, France

[73] Assignee: NACAM, Vendome, France

[21] Appl. No.: 843,585

[22] Filed: Mar. 25, 1986

[30] Foreign Application Priority Data

Mar. 25, 1985 [FR] France ............... 85 04426

[51] Int. Cl.4 ............................................. B62D 1/18
[52] U.S. Cl. ..................................... 280/775; 74/493; 180/146
[58] Field of Search ............... 74/555, 552, 556, 493; 180/146; 280/775

[56] References Cited

U.S. PATENT DOCUMENTS

| | | | |
|---|---|---|---|
| 2,464,856 | 3/1949 | Finley | 74/493 |
| 2,988,931 | 6/1961 | Markley, Jr. et al. | 74/555 |
| 3,167,971 | 2/1965 | Zeigler et al. | 74/555 |
| 4,396,207 | 8/1983 | Okamoto | 74/493 |
| 4,424,721 | 1/1984 | Deacon | 74/493 |
| 4,463,626 | 8/1984 | Kazaoka et al. | 74/493 |
| 4,495,833 | 1/1985 | Fourrey et al. | 74/493 |
| 4,554,843 | 11/1985 | Andersson | 74/493 |
| 4,561,323 | 12/1985 | Stromberg | 74/493 |
| 4,598,604 | 7/1986 | Sorsche et al. | 74/493 |

FOREIGN PATENT DOCUMENTS

| | | |
|---|---|---|
| 902586 | 1/1954 | Fed. Rep. of Germany . |
| 1581191 | 9/1969 | France . |
| 2360454 | 3/1978 | France . |
| 2033855 | 5/1980 | United Kingdom . |
| 2113629 | 8/1983 | United Kingdom . |

Primary Examiner—Richard A. Bertsch
Attorney, Agent, or Firm—Burns, Doane, Swecker & Mathis

[57] ABSTRACT

The device comprises a steering column support tube (1) connected to a housing (2) of rectangular section and mounted to be angularly movable by means of an articulation line connected to the body of the vehicle, between the wings (3) of a fixed bracket (4). The device further comprises locking means including a toggle system, a rod (7) extending through the housing and engaged in apertures (8) in the wings (3) of the bracket, the rod being provided at one end with abutment means (11, 11a) for abutment against one of the wings (3) of the bracket, and being provided at its opposite end with a head (12) between which head and the other of the wings (3) of the bracket (4) there is interposed at least one element (13, 14) of a toggle system provided with an actuating lever (14).

10 Claims, 9 Drawing Figures

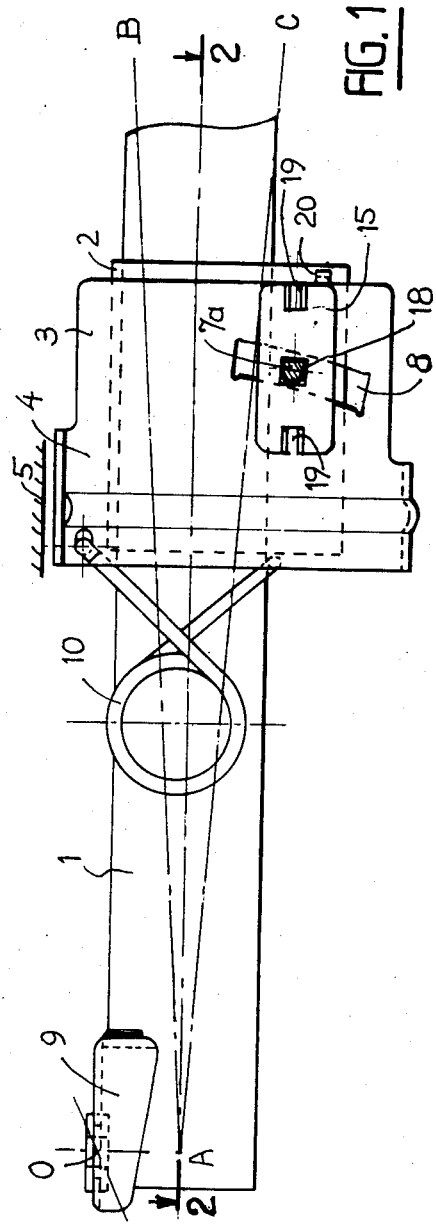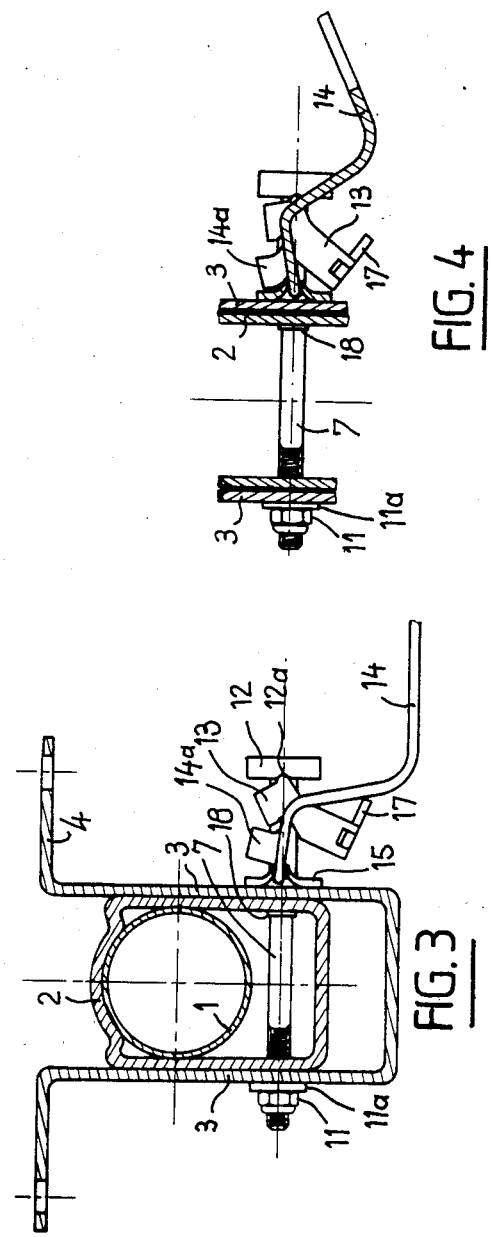

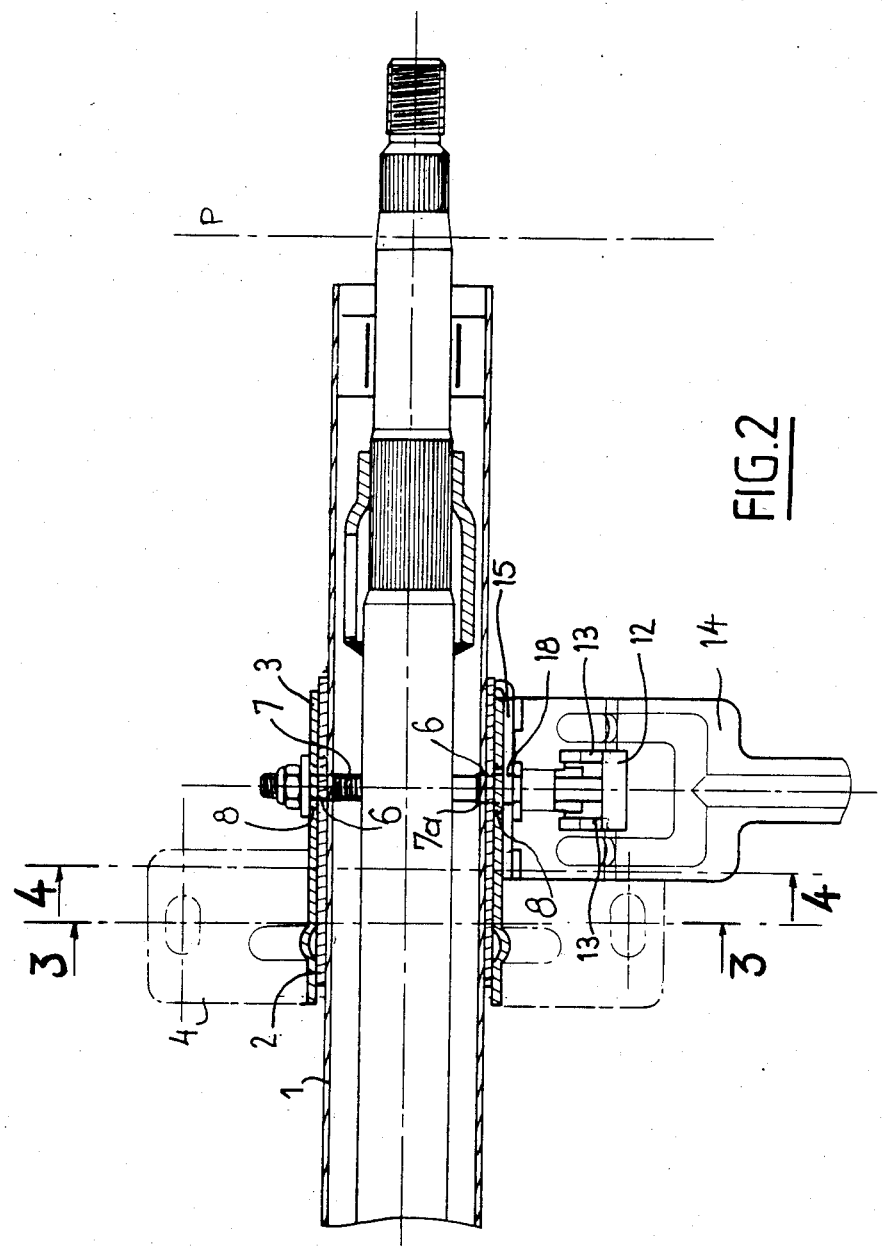

DEVICE FOR ADJUSTING A STEERING COLUMN OF A MOTOR VEHICLE PROVIDED WITH TOGGLE LOCKING MEANS

The present invention relates to device for adjusting steering columns for motor vehicles, and more particularly to an adjusting device for a steering column which is adjustable in height.

Some motor vehicles have already been provided for some years with devices for adjusting the position of the steering wheel for adapting the position of the steering wheel to the size of the vehicle driver.

The locking of these devices is ensured in to ways :

Locking means exist of the screw-and-nut type which are cheap but unpractical in utilization, since the locking depends on the force with which the nut is tightened by the user.

Systems having a cam or eccentric are also used which are relatively cheap but are a source of frictional forces, so that it is required to exert relatively great forces on the control lever of the system.

An object of the invention is to overcome the aforementioned drawbacks of the known devices by providing an adjusting device for a steering column whose position locking means combine a relative simplicity of construction and a precise and easy actuation.

The invention therefore provides a device for adjusting the position of a steering column of a motor vehicle, comprising a column support tube connected to a housing of rectangular section and mounted to be angularly movable by means of an articulation fixed to the body of the vehicle, between the wings of a fixed bracket, wherein there are provided t o g g l e locking means comprising a rod extending through said housing and engaged in openings provided in the wings of the bracket, said rod being provided at one end with abutment means against one of the wings of the bracket and being provided at its opposite end with a head between which and the other of said wings of the bracket there is interposed at least one element of a toggle system provided with a control lever.

A better understanding of the invention will be had from the following description which is given merely by way of example, with reference to the accompanying drawings, in which:

FIG. 1 is an elevational view of a device for adjusting a steering column according to the invention ;

FIG. 2 is a sectional view taken on line 2—2 of FIG. 1;

FIG. 3 is a sectional view taken on line 3—3 of FIG. 2, showing the locking means of the adjusting device according to the invention in the locked position ;

FIG. 4 is a partial sectional view taken on line 4—4 of FIG. 2, showing the locking means of the device in the unlocked position;

Figure 5:
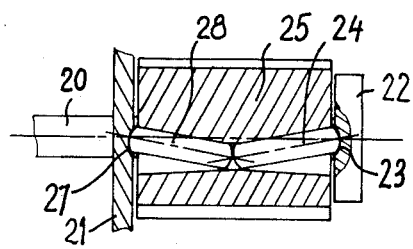
FIG. 5 is a sectional view of another embodiment of the locking means of the adjusting device according to the invention in the unlocked position.

The adjusting device for a steering column shown in FIGS. 1 to 3 is a device adapted to ensure solely the vertical adjustment of the steering column.

This device mainly comprises a column support tube 1 rendered rigid with a tubular housing 2 of rectangular section, for example by welding. The tube 1 is movable in a vertical plane between two wings 3 of a bracket 4 rigid with the body 5 of a vehicle.

The housing 2 comprises in its lateral walls two openings 6 adapted to permit the passage of a pin 7 (FIG. 2). The wings 3 of the bracket 4 each define a curved aperture 8. The apertures 8 of the wings 3 also have extending therethrough the pin 7 and are adapted to permit the angular displacement of the assembly comprising the column support tube 1 and the housing 2 around the centre of a swivel joint 9 mounted on the body of the vehicle.

As shown in FIG. 1, the column support tube 1 may be shifted in a vertical plane through an angle defined by the dot-dash straight lines AB, AC making an angle bisected by the axis of the tube 1.

These limits are defined by limits to the displacement of the pin 7 in the apertures 8 of the bracket 4.

A spring 10 whose ends are respectively connected to the column support tube 1 and to the bracket 4, is adapted to compensate for the weight of the assembly so as to enable it to be maintained in a mean position when the locking mechanism is released.

As can be seen better in FIG. 3, the pin 7 is formed by a screw whose screwthreaded end portion carries a nut 11 which bears against one of the wings 3 of the bracket 4 through an elastically yieldable washer 11a whose function will be explained hereinafter.

The screw of pin 7 has a head 12 on the inner surface of which bears a U-shaped pawl 13. Cooperating with the pawl 13 is a cranked actuating lever 15 which bears by one of its ends against a plate 15 applied against the corresponding wing 3 of the bracket 4.

As shown in FIG. 3, the housing 2 is therefore clamped against the wings 3 of the bracket 4 by means of the assembly consisting of the nut 11, the screw 7, the lever 14 and the pawl 13, the latter two elements constituting a toggle system. FIG. 3 shows the device in the locked position. In this position, the part of the lever 14 located between the plate 15 and the pawl 13, on one hand, and the part of the pawl 13 located between the lever 14 and the head of the screw 12, against which it bears in cavities 12a formed in the latter, on the other hand, exert, in the illustrated position which is beyond the passage through the dead centre position, a pull on the pin 7 and consequently ensure the clamping of the housing 2 between the wings 3 of the bracket 4.

In FIG. 4, the device is shown in the unlocked position. Indeed, the assembly consisting of the lever 14 and the pawl 13 is in a position before the passage through the dead-centre position, which ensures the release of the screw 7 as concerns movement in translation. The lever 14 is maintained in this position by a tab 14a which is a bent portion of the lever and abuts against the plate 15. The elastically yieldable washer 11a permits, when the mechanism is unlocked, the maintenance of the assembly under a small load so as to avoid noise during the adjustment of the column.

The pawl 13 has a tab 17 forming an abutment for the lever 14 when the latter is in the locking position shown in FIG. 3.

The toggle system just described provides a sufficient clamping force while requiring a small effort on the actuating lever 14. The bearing plate 15 of the lever 14 provides a sufficiently large bearing surface on the corresponding wing 3, the forces being transmitted through the portion of the lever 14 bearing against the plate. The screw 7 has a square-sectioned portion 7a which cooperates with one of the square openings 6 in the housing 1 so as to prevent the rotation of the screw 7. To permit the passage of the screw 7, the plate 15 also has a square-sectioned orifice 18 superimposed on the corresponding opening 6 of the housing 2.

As can be seen in FIG. 1, the plate 15 has a rectangular section and has on its two small sides slots 19 adapted to receive corresponding end tabs of the lever 14. Further, the plate 15 is prevented from rotating with respect to the wing 3 of the bracket 4 by a lateral tab 20.

FIGS. 5 to 8 show another embodiment of the locking device applied to the adjusting device according to the inventin.

This locking device comprises, as the foregoing device, a screw 20 which extends through, as in the preceding embodiment, a housing (not shown) connected to the steering column. The wings of a bracket fixed to the body of the vehicle and a plate 21 corresponding to the plate 15 of the embodiment shown in FIGS. 1 to 4. Formed in the head 22 of the screw 20 are three cavities 23 disposed at 120° to each other, and in which bear needles 24 disposed in the cylindrical body 25 of an actuating lever 26 through which the screw 20 extends.

The plate 21 also has cavities 27 disposed at 120° to each other in which are engaged the ends of the needles 28 which cooperate with the needles 24 so as to form with the latter corresponding toggle systems.

The needles 24 and 28 are disposed in frustoconical cavities 29, 30 adapted to permit the relative angular displacement of the needles during the rotation of the lever 26.

As can be seen in FIG. 5, the locking device is in the unlocked position.

Figure 6:
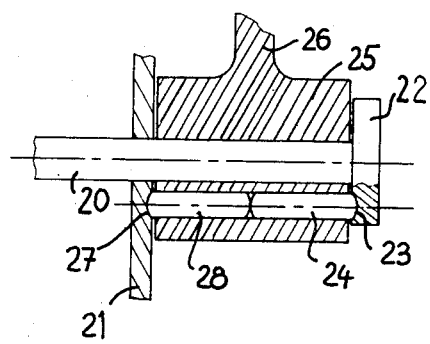
FIG. 6 is a sectional view similar to that of FIG. 5, showing the locking means in an intermediate position between the unlocked position and the locked position.

In FIG. 6, the locking device is in an unstable position as it passes through the dead-centre position.

Figure 7:
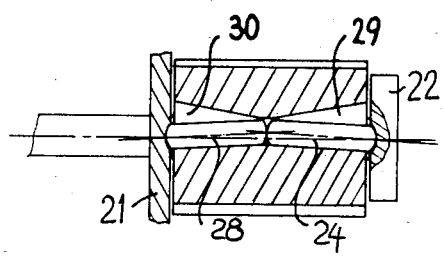
FIG. 7 is a sectional view similar to that of FIGS. 5 and 6, showing the locking means in the locked position.
Figure 8:
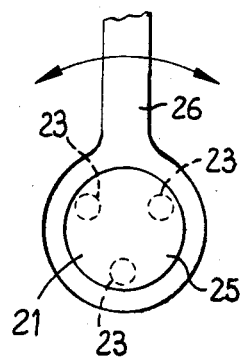
FIG. 8 is a partial side elevational view of the lever for actuating the locking means of FIGS. 5 to 7.

In FIG. 7, the device is in the stable locking position after having passed through the dead-centre position of FIG. 6.

The function performed by the device shown in FIGS. 5 to 8 is equivalent to that performed by the device of FIGS. 1 to 4, since the pairs of needles 24, 28 exert in the locking position shown in FIG. 7, by the bearing of the needles respectively against the plate 21 and against the head 22, a pull on said screw and consequently the clamping of the wings of the bracket maintaining the column on the housing connected to the latter.

Figure 9:
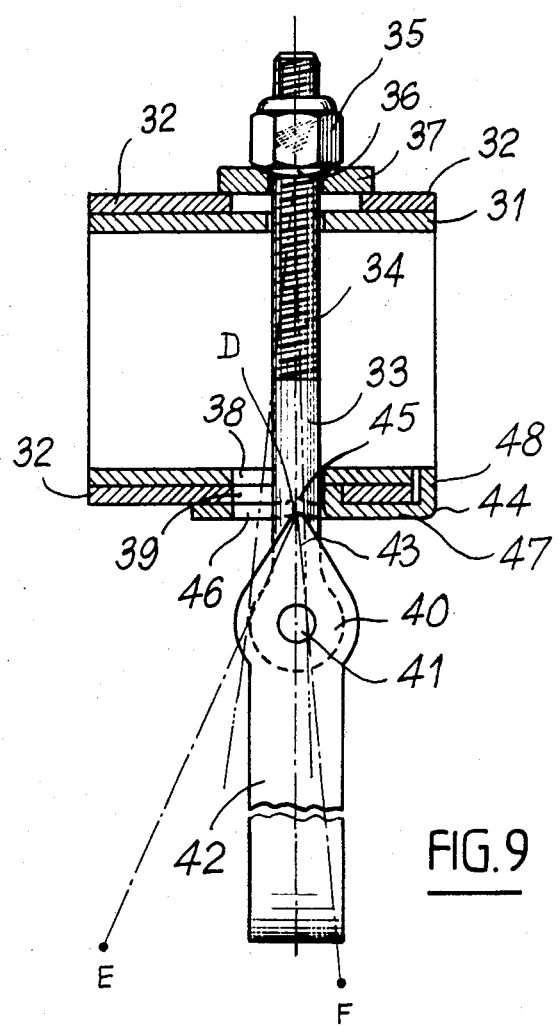
FIG. 9 is a sectional view of a third embodiment of the adjusting device according to the invention.

The adjusting device of the steering column shown in FIG. 9 comprises, as in the foregoing embodiments, a housing 31 connected to the steering column tube (not shown) and mounted to be movable between the wings 32 of a bracket fixed to the body of the vehicle.

The housing 31, and consequently the steering column, is locked in the chosen position by a toggle locking device comprising a rod 33 extending through the housing 31, and the wings 32 of the bracket and provided at one of its ends with a screwthreaded portion 34 on which is screwthreadly engaged a nut 35 having a spherical bearing surface 36 which cooperates with a washer 37 bearing against the corresponding wing 32 of the bracket.

The rod 33 extends through openings 38 in the housing 31 which are adapted to permit the angular displacement of the rod.

It extends through apertures 38 in the wings of the bracket which are also adapted to permit the angular displacement.

These apertures have moreover a shape suitable for ensuring the angular displacements of the steering column in the manner described with reference to the foregoing embodiments.

At the end thereof opposed to the nut 35, the rod 33 has a head provided with an eye 40 in which is engaged a pivot pin 41 of a yoke 42 forming an actuating lever, the points 43 of the yoke 42 bearing against a plate 44 applied against the corresponding wing 32 of the bracket and provided with bearing cavities 45 for said points 43.

The plate 44 also has an aperture 46 having a shape identical to that of the apertures 38 of the wings 32 of the bracket.

It is immobilized relative to the corresponding wing 32 by bent-over tabs 47, 48.

In FIG. 9, the toggle system formed by the rod 33 and the yoke 42 is shown in its unstable dead-centre position.

The axes DE and DF in dot-dash lines represent respectively the positions of the toggle in the adjusting device's locking and unlocking positions.

When the yoke 42 is pivoted about its bearing points 43, there is an angular displacement of the rod 33 owing to the presence of the spherical bearing surface 36 of the nut 35.

The locking and unlocking positions are determined by the fact that the rod 33 comes into abutting relation with the edges 46a and 46b of the aperture 46 in the plate 44.

What is claimed is:

1. A device for adjusting the position of a steering column relative to a body of a motor vehicle, said device comprising a tube for supporting the column, a housing of substantially rectangular shape connected to the tube, a bracket for mounting on the body of the vehicle in a fixed position and having two spaced-apart wings, an articulation fixed relative to the body of the vehicle and connected to the tube for pivotally mounting the tube relative to said body between the wings of the bracket toggle locking means comprising openings in the wings of the bracket, a rod extending through the housing and engaged in the openings in the wings of the bracket, the rod having at a first end thereof abutment means cooperative with a first of the wings of the bracket and at a second end opposed to the first end of the rod a head, and a toggle system including an actuating lever and at least one element interposed between a second of said wings and the head of the rod.

2. A device according to claim 1, comprising, interposed between the head of the rod and said second wing of the bracket, two elements of the toggle system constituted by the actuating lever, one end of which lever bears against said second wing of said bracket through a plate and a U-sectioned pawl cooperative with said lever and having branches engaged at ends of the branches in cavities in the head of the rod.

3. An adjusting device according to claim 2, wherein said pawl has a tab forming an abutment for the actuating lever in the locking position of the device.

4. An adjusting device according to claim 2, wherein said actuating lever has an abutment tab assuming an abutting position in the unlocking position of the device.

5. An adjusting device according to claim 3, wherein said actuating lever has an abutment tab assuming an abutting position in the unlocking position of the device.

6. An adjusting device according to claim 1, comprising, interposed between the head of the rod and said second wing of the bracket, elements of the toggle system constituted by pins disposed in a body of the actuating lever through which body said rod extends, said pins being interposed between the head of the rod and a plate which bears against a wing of said bracket.

7. An adjusting device according to claim 6, wherein said body of the actuating lever defines frustoconical cavities, said head of the rod and said plate respectively comprise recesses for receiving ends of the respective pins which are mounted in the frustoconical cavities, the frustoconical cavities permitting an angular movement of the pins during the rotation of the actuating lever.

8. An adjusting device according to claim 1, wherein said toggle system is constituted by the rod which is mounted to be angularly movable about said abutment means and on the head of which rod there is pivotally mounted a yoke which forms the actuating lever and has branches which bear by points against a bearing plate bearing against said second wing, said rod being movable between a locking position and an unlocking position defined by ends of an aperture provided in said bearing plate.

9. An adjusting device according to claim 1, wherein the abutment means provided at the end of said rod are formed by a nut and a screwthreaded end portion of said rod cooperative with the nut, said nut further constituting means for adjusting the clamping force exerted by the toggle system.

10. A device according to claim 8, wherein the abutment means provided at the end of said rod are formed by a nut and a screwthreaded end portion of said rod cooperative with the nut, said nut further constituting means for adjusting the clamping force exerted by the toggle system, the nut defining a spherical bearing surface ensuring the angular displacements of said rod, and the housing and the wings of said bracket having apertures permitting the angular displacements of said rod between the locking and unlocking positions of the toggle system.

* * * * *